United States Patent
Mazur et al.

(10) Patent No.: US 11,556,109 B2
(45) Date of Patent: *Jan. 17, 2023

(54) SYSTEMS AND METHODS FOR MONITORING DEVICE INFORMATION

(71) Applicant: Rockwell Automation Technologies, Inc., Mayfield Heights, OH (US)

(72) Inventors: David C. Mazur, Mequon, WI (US); Mithun M. Nagabhairava, Brookfield, WI (US); Peter J. Flickinger, Oak Creek, WI (US); Ryan Coon, Franklin, WI (US); Jonathan D. Walter, Cleveland, OH (US); Jonathan Wise, Cleveland, OH (US); Calvin C. Steinweg, Hartford, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/184,275

(22) Filed: Feb. 24, 2021

(65) Prior Publication Data

US 2021/0181707 A1 Jun. 17, 2021

Related U.S. Application Data

(63) Continuation of application No. 16/137,168, filed on Sep. 20, 2018, now Pat. No. 10,955,816.

(51) Int. Cl.
*G05B 19/406* (2006.01)
*G06F 16/26* (2019.01)

(52) U.S. Cl.
CPC .......... *G05B 19/406* (2013.01); *G06F 16/26* (2019.01); *G05B 2219/31449* (2013.01)

(58) Field of Classification Search
CPC ........ G05B 19/406; G05B 2219/31449; G06F 16/26
(Continued)

(56) References Cited

U.S. PATENT DOCUMENTS 6,832,118 B1 * 12/2004 Heberlein ............ G05B 19/042
  700/20
2002/0045976 A1   4/2002 Kodama
(Continued)

FOREIGN PATENT DOCUMENTS

CN         1940794 A    4/2007
CN       103049823 A    4/2013
(Continued)

OTHER PUBLICATIONS

Extended European Search Report for EP Application No. 19196679.5-1205 dated Feb. 18, 2020.
(Continued)

*Primary Examiner* — Jigneshkumar C Patel
(74) *Attorney, Agent, or Firm* — Fletcher Yoder, P.C.

(57) ABSTRACT

Provided herein are techniques related to an industrial system that may have a plurality of industrial automation devices, a database that has a plurality of location datasets that correspond to the plurality of industrial automation devices, and a monitoring system that may communicate with the industrial automation devices via a network and the database. The monitoring system may send a first request to the industrial automation devices in the industrial system to identify an industrial automation device having an active maintenance status. The active maintenance status may be indicative of a maintenance request for the industrial automation device. The monitoring system may send a second request to the database for a location dataset associated with the industrial automation device, generate a visualization
(Continued)

that includes the active maintenance status and the location dataset associated with the industrial automation device, and display the visualization via an electronic display.

20 Claims, 7 Drawing Sheets

(58) Field of Classification Search
 USPC .......................................................... 700/28
 See application file for complete search history.

(56) References Cited

U.S. PATENT DOCUMENTS

| | | | |
|---|---|---|---|
| 2003/0028269 A1* | 2/2003 | Spriggs | G06Q 10/087 |
| | | | 700/83 |
| 2005/0071124 A1 | 3/2005 | Komatsu | |
| 2005/0107897 A1 | 5/2005 | Callaghan | |
| 2010/0017746 A1 | 1/2010 | Husoy et al. | |
| 2013/0016104 A1 | 1/2013 | Morrison et al. | |
| 2015/0143268 A1* | 5/2015 | Retlich | H04L 41/22 |
| | | | 715/763 |
| 2016/0285959 A1 | 9/2016 | Vasko et al. | |
| 2016/0370787 A1 | 12/2016 | Hashimoto | |

FOREIGN PATENT DOCUMENTS

| | | |
|---|---|---|
| CN | 105094794 A | 11/2015 |
| CN | 106561079 A | 4/2017 |

OTHER PUBLICATIONS

Communication pursuant to Article 94(3) EPC for EP Application No. 19196679.5-1205 dated Aug. 27, 2021, 8 pages.

Notification of the First Office Action for CN Application No. 201910744410.X dated Jul. 5, 2022, 9 pages.

* cited by examiner

SYSTEMS AND METHODS FOR MONITORING DEVICE INFORMATION

CROSS-REFERENCE TO RELATED APPLICATIONS

This is a continuation application of U.S. patent application Ser. No. 16/137,168, entitled "SYSTEMS AND METHODS FOR MONITORING DEVICE INFORMATION", filed on Sep. 20, 2018, which is hereby incorporated by reference herein in its entirety for all purposes.

BACKGROUND

The present disclosure relates generally to monitoring industrial automation device information. More specifically, the present disclosure relates to determining location information for various industrial automation devices in a system and presenting a visualization that provides an indication of the location information.

Industrial systems may be designed with a number of devices stored in various locations throughout the industrial systems. For example, a device may be located within some compartment of some section of a building within an industrial system. Industrial systems can be very large and complex, which may make it difficult for users to locate certain devices in the industrial systems. As such, it may be useful to provide systems and methods for identifying the locations of various devices in a particular system and providing a visualization to help users navigate to the devices in the system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium has computer-executable instructions that, when executed, may cause a processor to send a first request to a plurality of industrial automation devices in an industrial automation system to identify an industrial automation device of the plurality of industrial automation devices that has an active maintenance status. The active maintenance status may be indicative of a maintenance request for the industrial automation device. The computer-executable instructions may also cause a process to send a second request to a database for a location dataset associated with the industrial automation device. The database may have a plurality of location datasets that correspond to the plurality of industrial automation devices. The computer-executable instructions may also generate a visualization comprising the active maintenance status and the location dataset associated with the industrial automation device and display the visualization via an electronic display. The visualization may present the active maintenance status on a first side of the visualization and the location dataset on a second side of the visualization.

In another embodiment, a method may send a first request to a plurality of industrial automation devices in an industrial automation system to identify an industrial automation device of the plurality of industrial automation devices that has an active maintenance status. The active maintenance status may be indicative of a maintenance request for the industrial automation device. The method may also send a second request to a database for a location dataset associated with the industrial automation device. The database may have a plurality of location datasets that correspond to the plurality of industrial automation devices. The method may also generate a visualization comprising the active maintenance status and the location dataset associated with the industrial automation device and display the visualization via an electronic display. The visualization may present the active maintenance status on a first side of the visualization and the location dataset on a second side of the visualization.

In another embodiment, an industrial automation system may have a plurality of industrial automation devices, a database that has a plurality of location datasets that correspond to the plurality of industrial automation devices, and a monitoring system that may communicate with a plurality of industrial automation devices via a network and a database. The monitoring system communicatively coupled to the industrial automation equipment via a network and the database. The monitoring system may send a first request to the plurality of industrial automation devices in the industrial system to identify an industrial automation device of the plurality of industrial automation devices that has an active maintenance status. The active maintenance status may be indicative of a maintenance request for the industrial automation device. The monitoring system may also send a second request to the database for a location dataset associated with the industrial automation device, generate a visualization comprising the active maintenance status and the location dataset associated with the industrial automation device, and display the visualization via an electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 7:
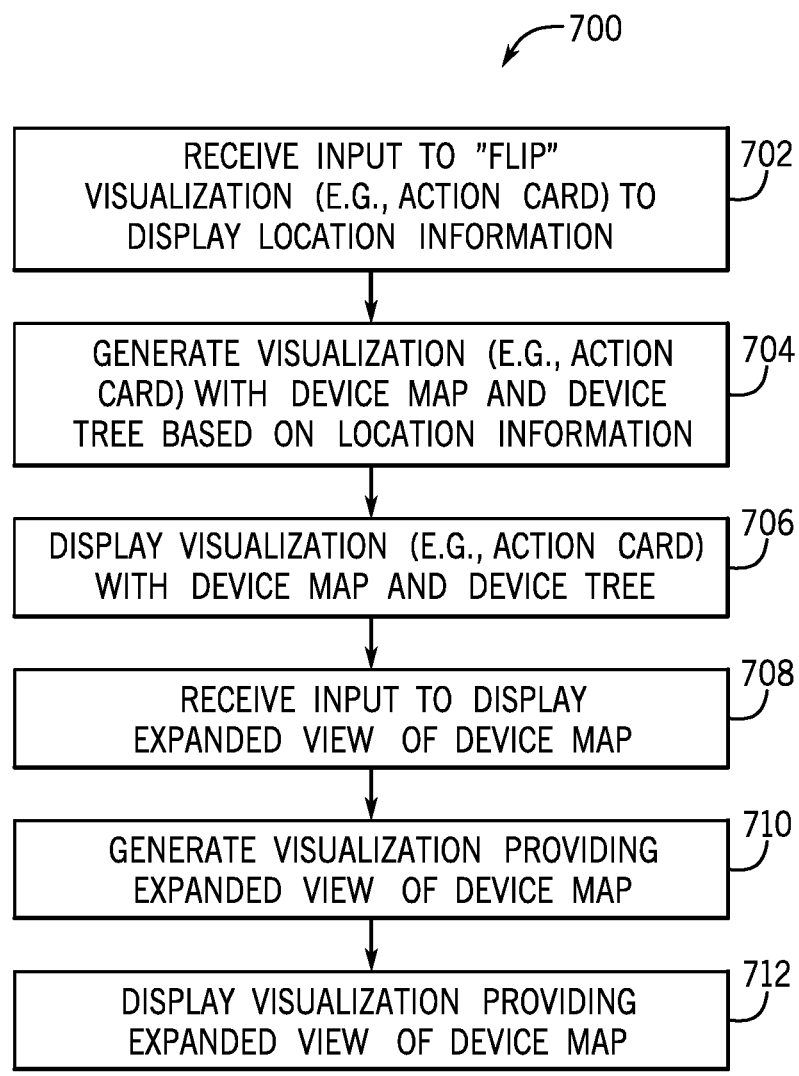
Figure 8:
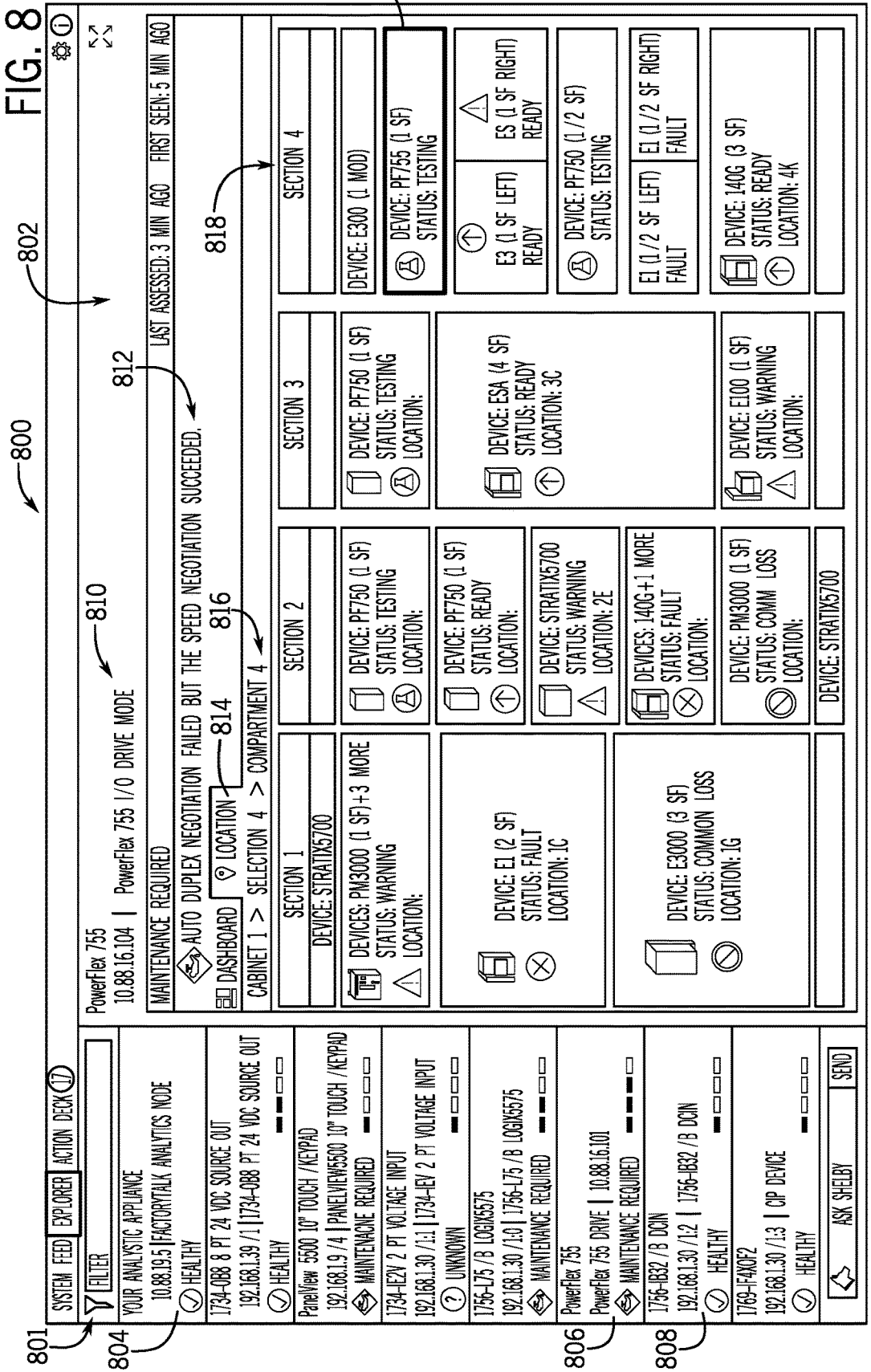

FIG. 7 is a flow chart of a method for generating and displaying various visualizations that provide location information, maintenance information, or both, associated with one or more industrial automation devices, in accordance with embodiments described herein; and FIG. 8 illustrates an example of an expanded view of a device map visualization that may be generated by the method of FIG. 7, in accordance with embodiments described herein;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Industrial automation systems may often involve large facilities or multiple facilities that contain numerous industrial automation equipment, each of which having a variety of industrial automation devices. For example, such industrial automation equipment may include data centers, motor control centers, switchgears, or the like. The industrial automation equipment may often be subdivided into cabinets, sections, compartments, or the like, that may contain one or more industrial automation devices. For example, a motor control center may have 1 through N sections, such that each section of the motor control center may have 1 through M compartments, and each compartment may contain one or more industrial automation devices. When an industrial automation device in such systems may need maintenance or goes offline from a network, maintenance personnel may refer to hardcopy diagrams or layouts of the entire industrial automation system or the industrial automation equipment to determine the location of the industrial automation device that may need or request maintenance. This process may often be very time-consuming and labor-intensive. As such, it may be desirable for maintenance personnel to easily determine the location of an industrial automation device for maintenance operations before physically going to the general location of the industrial automation device, for example, in a motor control center, data center, switchgear, or the like.

Accordingly, embodiments of the present disclosure are generally directed to a monitoring system that receives identification and maintenance information associated with one or more industrial automation devices in industrial automation equipment communicatively coupled to a network in an industrial automation system. The monitoring system receives location information (e.g., datasets) associated with each industrial automation device from a database based on the received identification information. The database may store the location information of each industrial automation device after the industrial automation equipment is assembled. The database may provide location information of an industrial automation device with respect to other devices in the industrial automation equipment. In some cases, the location information for a device may be provided regardless of whether the industrial automation device is connected to the network of the industrial automation system.

After retrieving the location information for each industrial automation device, the monitoring system may generate a visualization that provides location information associated with each industrial automation device in the industrial automation system. For example, the generated visualization may include an indication of a location of each industrial automation device in the industrial automation system with respect to adjacent industrial automation devices, indications of compartment sizes for the industrial automation devices, and the like.

In some embodiments, the monitoring system may also receive maintenance information from the database, the industrial automation devices, or other suitable data source. As such, the visualization may include an action card that may provide maintenance information associated with an industrial automation device on a portion of the action card and location information associated with the industrial automation device associated with the maintenance information on a second portion of the action card. In some embodiments, the action cards may include two sides, such that the monitoring system may generate and display a visualization of the second side of the action card in response to receiving an input (e.g., a user selection of a "flip" graphic) to transition from the first side of the action card to the second side of the action card. Additionally, the monitoring system may generate and display a visualization of the first side of the action card in response to receiving an input (e.g., a user selection of a "flip" graphic) to transition from the second side of the action card to the first side of the action card. In certain embodiments, the transition may be represented by a visual effect, such as a flip effect or a rotate effect of the first side of the action card to the second side of the action card.

Additionally, the action card visualization may provide location information associated with the industrial automation device via a device tree, a device map, or the like. In certain embodiments, the device tree may include an industrial automation equipment identifier, a cabinet identifier, a section identifier, a compartment identifier, or the like, that corresponds to the physical location of the industrial automation device in the industrial automation system. In certain embodiments, the device map may include a virtual representation of the physical layout or physical position of the industrial automation device and nearby industrial automation devices in the industrial automation equipment. That is, the device map may provide a proportional representation of the cabinets, sections, compartments, or the like, indicative of where the industrial automation devices are located.

Further, the monitoring system may generate and display a visualization that provides an expanded view of the device map provided via the action card. The expanded view may display the location and maintenance information associated with the industrial automation device and nearby industrial automation devices in the industrial automation equipment. As such, the monitoring system may enhance an efficiency in providing location and maintenance information associated with an industrial automation device to maintenance personnel, thereby reducing the time necessary to complete a maintenance action. Additional details regarding the monitoring system will be discussed below with reference to FIGS. 1-9.

Figure 1:
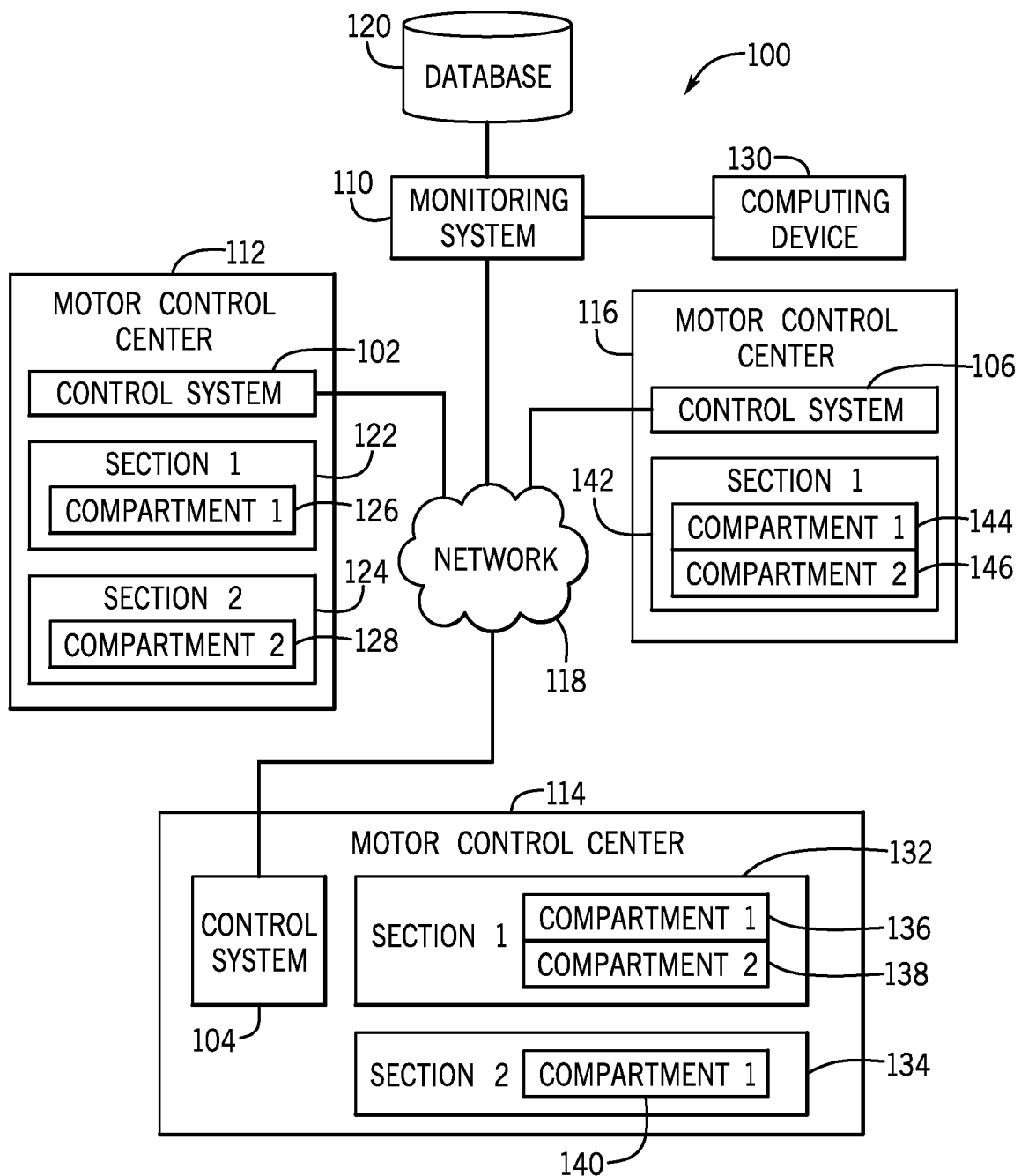
FIG. 1 illustrates a block diagram of an industrial automation system, in accordance with embodiments described herein.

By way of introduction, FIG. 1 illustrates a block diagram of an exemplary industrial automation system 100, in accordance with embodiments presented herein. The industrial automation system 100 may include a monitoring system 110 that receives identification information, maintenance information, and the like, associated with one or more industrial automation devices from various control systems 102, 104, 106 via a network 118. In certain embodiments, the one or more industrial automation devices may be associated with industrial automation equipment 112, 114, 116, such as motor control centers, data centers, power control rooms, switchgears, or the like. It should be noted that any suitable network may be employed in the embodiments described herein. For instance, the network 118 may include any wired or wireless network that may be implemented as a local area network (LAN), a wide area network (WAN), and the like. Indeed, other industrial communication network protocol, such as EtherNet/IP, ControlNet, DeviceNet, and the like, may also be used. In any case, the network 118 may permit the exchange of data in accordance with a protocol.

In some embodiments, the monitoring system 110 may crawl the network 118 and identify each industrial automation device that may be communicatively coupled to the network 118. The monitoring system 110 may then send a request to database 120 for location information associated with one or more identified industrial automation devices in the industrial automation system 100 based on the received identification information. It should be noted that the database 120 may be a proprietary database that exclusively communicates with the monitoring system 110 or other devices through a certain proprietary protocol.

The database 120 may be organized to include a list of industrial automation systems 100 manufactured for a number of clients, on particular dates, for certain locations, for certain industries, and the like. The databased 120 may index an industrial automation device based on a serial number, the vendor code, the product code, the internet protocol (IP) address, or the like, associated with an industrial automation device. In certain embodiments, the database 120 may index an industrial automation device based on a unique identifier that includes a combination of the serial number, the vendor code, the product code, the product type, the internet protocol (IP) address, or the like, associated with the industrial automation device.

In some embodiments, based on the identified industrial automation devices, the monitoring system 100 may query the database 120 to identify a particular industrial automation system 100 that includes the same identified industrial automation devices. In any case, after identifying a particular industrial automation system 100 within the database 120, the monitoring system 110 may extract location information for each of the identified industrial automation devices from the database 120. The location information may include a layout or arrangement for the industrial automation devices, dimension or form factor data for each of the industrial automation devices, cabinet or compartment layout designs for the industrial automation devices, or the like.

After receiving the location information associated with an industrial automation device from database 120, the monitoring system 110 may generate and display a visualization providing the location information associated with each industrial automation device in the industrial automation system 100. Additional details with regard to the visualization will be discussed below with reference to FIGS. 4 to 8.

In certain embodiments, the monitoring system 110 may be communicatively coupled to a computing device 130. In such embodiments, the monitoring system 110 may send a command to the computing device 130 to generate and display the visualization providing the location information of an industrial automation device in relation to other industrial automation devices in the industrial automation system 100. The monitoring system 110 may also display a visualization that includes the maintenance information, the identification information, and the like related to the industrial automation device. The computing device 130 may be any suitable computing device that includes communication abilities, processing abilities, and the like. For example, the computing device 130 may be any general computing device that may monitor, control, and/or operate the industrial automation equipment. It should be noted that the monitoring system 110 may also be any suitable computing device like the computing device 130. As such, the monitoring system 110 and/or the computing device 130 may be a general-purpose computer, a mobile computing device, a laptop-computing device, a tablet computing device, a wearable computing device (e.g., a smartwatch), and the like. Additional details with regard to the monitoring system 110 will be discussed below with reference to FIG. 2.

As described above, the industrial automation system 100 may have one or more facilities that contain industrial automation equipment having a variety of industrial automation devices. As illustrated in FIG. 1, a plurality of industrial automation devices may be located in one or more motor control centers 112, 114, 116. Each industrial automation device may be located in a particular motor control center 112, 114, 116, a particular section 122, 124, 132, 134, 142 of the motor control center 112, 114, 116, a particular compartment 126, 128, 136, 138, 140, 144, 146 of a section 122, 124, 132, 134, 142 of a motor control center 112, 114, 116, or the like.

It should be noted that the illustrated embodiment is intended to be non-limiting and that an industrial automation system 100 may include any suitable number of motor control centers, any suitable number of sections, any suitable number of compartments, or the like. Additionally, or alternatively, an industrial automation system 100 may include any suitable number of other industrial automation equipment that have one or more industrial automation devices. The industrial automation devices may include any component or part that performs a specific operation for the respective industrial automation equipment. For example, the industrial automation devices may include controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.), data centers, and the like.

In certain embodiments, based on data received from the industrial automation devices, the monitoring system 110 may receive maintenance information indicative of a maintenance status request (e.g., active request, offline) for one or more industrial automation devices from various industrial automation control systems 102, 104, 106. The maintenance information associated with an industrial automation device may include a maintenance status (e.g., a one-word or two-word descriptor) of the industrial automation device, a description of one or more maintenance issues with the industrial automation device, or the like. For example, a maintenance status of the industrial automation device may indicate that the industrial automation device is ready for operation, the industrial automation device has a fault, the industrial automation device has experienced communication loss with the control system and/or network, the industrial automation device is undergoing testing, a general warning that there may be some problem with the industrial automation device, or the like. The identification information associated with an industrial automation device may include a serial number, a vendor code, a product code, a product type, an internet protocol (IP) address, or the like that may be used to identify or locate the industrial automation device. In certain embodiments, the identification information may include a unique identifier that may be a combination of the serial number, the vendor code, the product code, the product type, the internet protocol (IP) address, or the like, associated with the industrial automation device.

As mentioned above, the monitoring system 110 may receive location information associated with one or more industrial automation devices from the database 120. The location information may include a location identifier of the industrial automation device within an industrial automation system. For example, a location identifier for a motor control drive located within a motor control center 112, 114, 115 may include a cabinet identifier, a section identifier, and a compartment identifier. The cabinet identifier may correspond to a cabinet of the motor control center in which the motor control drive is located, the section identifier may correspond to a section of the cabinet in which the motor control drive is located, and the compartment identifier may correspond to a compartment of the section in which the motor control drive is located. It should be noted that the previous example is non-limiting, and that any suitable combination of cabinet identifiers, section identifiers, compartment identifiers, or the like may be used to correspond to a location of an industrial automation device within an industrial automation control system. The location identifier may also include an industrial automation equipment identifier, such as a motor control center identifier, a data center identifier, a switchgear identifier, or the like. In certain embodiments, the monitoring system 110 may also receive a unique identifier associated with the location information. The unique identifier may be a combination of a serial number, a vendor code, a product code, a product type, an IP address, or the like, associated with the industrial automation device.

In certain embodiments, it may be desirable to provide global positioning sensor (GPS) coordinates of one or more industrial automation devices in an industrial automation system. For example, an industrial automation device or industrial automation equipment may be mobile such that the position of the industrial automation device or the industrial automation equipment may change. As such, the location information associated with each industrial automation device in the industrial automation system may include GPS information, such as GPS coordinates, associated with the one or more industrial automation devices.

In some embodiments, the location information may include near-field communication identifiers, such as radio frequency identification (RFID) tags, that may be used to locate the industrial automation device inside a building where GPS sensors may not be operable. The indoor location information may be provided by triangulation sensors, Bluetooth® beacons, and other suitable sensors that provide directional data of a respective industrial automation device relative to the computing device 130 or other suitable device.

To maintain the location information for each industrial automation device in the industrial automation system 100, the database 120 may automatically be updated with the location information associated with the one or more industrial automation devices at various times. For example, in certain embodiments, after assembly of industrial automation equipment 112, 114, 116, the location information associated with each industrial automation device in the industrial automation equipment 112, 114, 116 may be stored in a data file or the like associated with the respective industrial automation system 100. The data file may then be uploaded to the database 120. In certain embodiments, a database file may be generated after the assembly of industrial automation equipment 112, 114, 116 and may contain location information associated with each industrial automation device in the industrial automation equipment 112, 114, 116. The location information may include location identifiers corresponding to the location of each industrial automation device in an industrial automation equipment 112, 114, 116. For example, a location identifier of an industrial automation device may indicate that the industrial automation device is located in cabinet 1, section 4, compartment C. The database file may be a JavaScript Object Notation (JSON) file or another suitable database file. The database file may then be imported into the database 120 via any suitable electronic storage device.

In certain embodiments, the location information in the database 120 may be updated to correspond to a change in the configuration of the industrial automation devices in the industrial automation equipment 112, 114, 116. For example, after a first industrial automation device is replaced with a second industrial automation device, the location information in the database 120 may automatically be updated to reflect the change by associating the location information with the second industrial automation device in the database 120. For example, in certain embodiments, the monitoring system 110 may receive a notification of a new device and a location of the new device. The monitoring system 110 may then determine that the new device replaced another device that is no longer part of the system and send an update to the database regarding the same.

In another example, a database file may be generated or modified after the replacement of the first industrial automation device with the second industrial automation device that contains the location information associated with the second industrial automation device. For example, in certain embodiments, a user may create or update a database file to include the location of a new device after replacing an old device with the new device in a system. The database file may then be imported into the database 120. The database 120 may then replace the data associated with the first industrial automation device with data associated with the second industrial automation device. As such, the database 120 may provide location information of an industrial automation device in the industrial automation system 100 to the monitoring system 110 regardless of whether the industrial automation system is connected to the network 118.

The industrial automation equipment 112, 114, 116 in the industrial automation system 100 may take many forms and may include industrial automation devices for accomplishing many different and varied purposes. For example, the industrial automation equipment may include machinery used to perform various operations in a compression station, an oil refinery, a batch operation for making food items, a mechanical assembly line, and so forth. Accordingly, the industrial automation equipment may include a variety of operational components, such as electric motors, valves, actuators, temperature elements, pressure sensors, or a myriad of machinery or devices used for manufacturing, processing, material handling, and other applications.

Additionally, the industrial automation equipment may include various types of equipment that may be used to perform the various operations that may be part of an industrial application. For instance, the industrial automation equipment may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like.

The industrial automation equipment may include a computing device and/or a communication component that enables the industrial automation equipment to communicate data between each other and other devices. For example, in the illustrated embodiment, each of the motor control centers 112, 114, 116 may have control systems 102, 104, 106, respectively. The control systems 102, 104, 106 may include a communication component that may include a network interface that may enable the industrial automation equipment to communicate via various protocols such as EtherNet/IP, ControlNet, DeviceNet, or any other industrial communication network protocol. Alternatively, the communication component may enable the industrial automation equipment to communicate via various wired or wireless communication protocols, such as Wi-Fi, mobile telecommunications technology (e.g., 2G, 3G, 4G, or LTE), Bluetooth®, near-field-communications technology, and the like.

Figure 2:
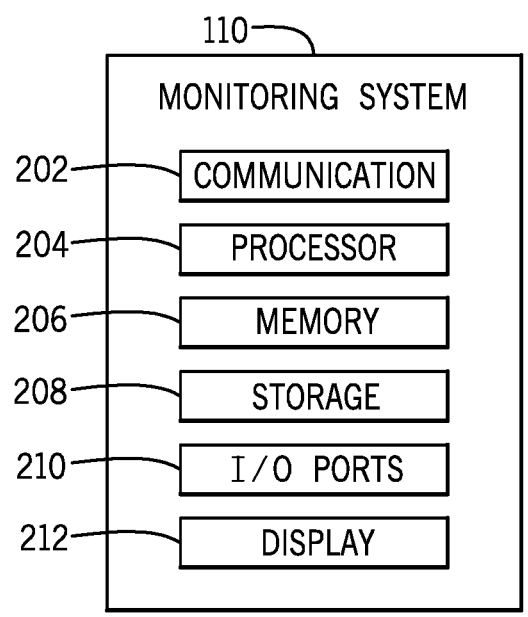
FIG. 2 illustrates a block diagram of a monitoring system employed by the industrial automation system of FIG. 1, in accordance with embodiments described herein.

To perform some of the actions set forth above, the monitoring system 110 may include certain embodiments to facilitate these actions. FIG. 2 is a block diagram of example components within the monitoring system 110. For example, the monitoring system 110 may include a communication component 202, a processor 204, a memory 206, a storage 208, input/output (I/O) ports 210, a display 212, and the like. The communication component 202 may be a wireless or wired communication component that may facilitate communication between the monitoring system 110, the database 120, the computing device 130, the control systems 102, 104, 106, and the like. Additionally, the communication component 202 may facilitate data transfer to the monitoring system 110, such that the monitoring system 110 may receive the location information from the database 120, receive the identification information and the maintenance information from the control systems 102, 104, 106, and the like.

The processor 204 may be any type of computer processor or microprocessor capable of executing computer-executable code. The processor 204 may also include multiple processors that may perform the operations described below.

The memory 206 and the storage 208 may be any suitable articles of manufacture that can serve as media to store processor-executable code, data, or the like. These articles of manufacture may represent computer-readable media (e.g., any suitable form of memory or storage) that may store the processor-executable code used by the processor 204 to perform the presently disclosed techniques. The memory 206 and the storage 208 may also be used to store data, consumer models, various other software applications, and the like. The memory 206 and the storage 208 may represent non-transitory computer-readable media (e.g., any suitable form of memory or storage) that may store the processor-executable code used by the processor 204 to perform various techniques described herein. It should be noted that non-transitory merely indicates that the media is tangible and not a signal.

The I/O ports 210 may be interfaces that couple to other peripheral components such as input devices (e.g., keyboard, mouse), sensors, I/O modules, and the like. The display 212 may operate to depict visualizations associated with software or executable code being processed by the processor 204. In one embodiment, the display 212 may be a touch display capable of receiving inputs from a user of the monitoring system 110. The display 212 may be any suitable type of display, such as a liquid crystal display (LCD), plasma display, or an organic light emitting diode (OLED) display, for example. Additionally, in one embodiment, the display 212 may be provided in conjunction with a touch-sensitive mechanism (e.g., a touch screen) that may function as part of a control interface for the monitoring system 110.

It should be noted that the components described above with regard to the monitoring system 110 are exemplary components and the monitoring system 110 may include additional or fewer components as shown. Additionally, it should be noted that the computing device 130 may also include similar components as described as part of the monitoring system 110.

Figure 3:
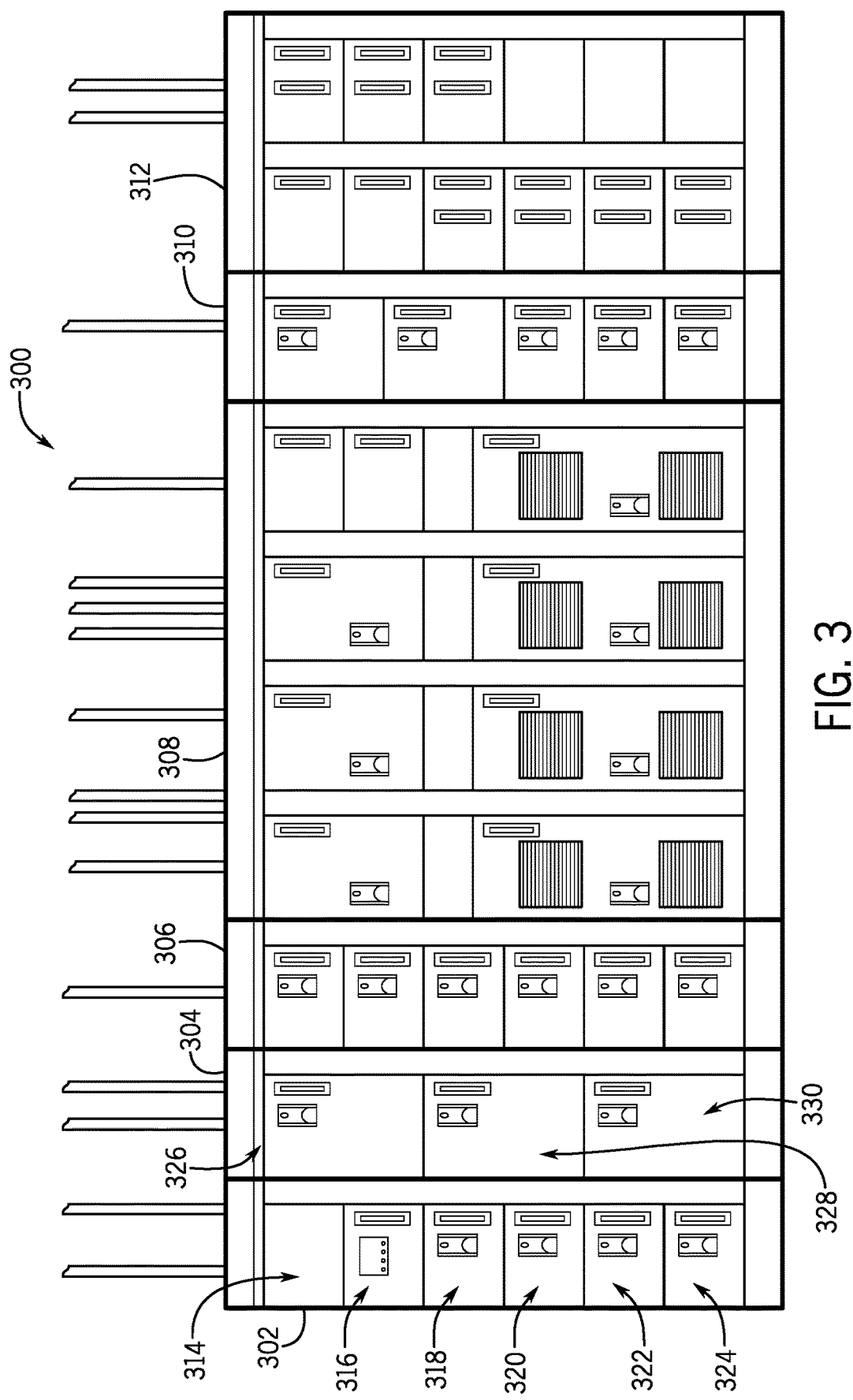
FIG. 3 illustrates an example of a motor control center that may communicate with the monitoring system of FIG. 1, in accordance with embodiments described herein.

As described above with regard to FIG. 1, an industrial automation device may be located in a particular motor control center, a particular section of a motor control center, a particular compartment of a section of a motor control center, or the like. FIG. 3 illustrates an exemplary embodiment of a motor control center 300 having a plurality of industrial automation devices located within the motor control center 300. In the illustrated embodiment, the motor control center 300 has a plurality of sections 302, 304, 306, 308, 310, 312. For example, section 302 may include compartments 314, 316, 318, 320, 322, 324, and section 304 may include compartments 326, 328, 330. One or more industrial automation devices may be located in each compartment of the motor control center 300. For example, a motor starter may be located in compartment 318 of section 302 of motor control center 300. In another example, a power monitor may be located in compartment 316 of section 302 of motor control center 300.

As shown in FIG. 3, given the number of sections, compartments, and cabinets of the motor control center, it may be challenging for an individual to efficiently identify the location of a particular industrial automation device stored within a particular enclosure. Indeed, the sections, compartments, and cabinets may be identified with identification tags that correspond to alphanumeric codes that may not be indicative of the components stored therein. As such, the presently disclosed embodiments provide an efficient way to identify the location of certain industrial automation devices in complex and large industrial environments.

Figure 4:
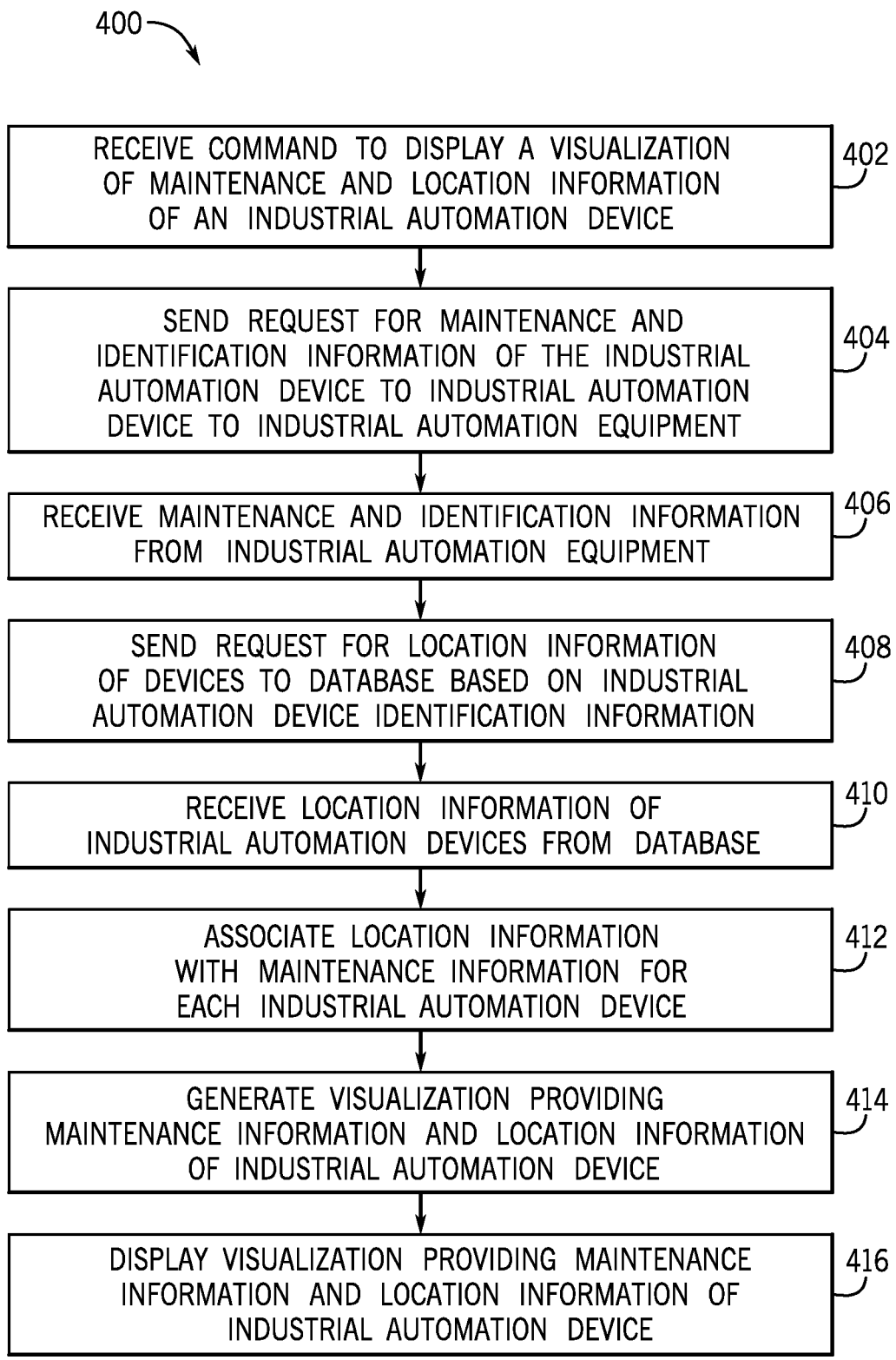
FIG. 4 illustrates a flow chart of a method for generating and displaying a visualization that provides location and maintenance information associated with an industrial automation device, in accordance with embodiments described herein.

With the foregoing in mind, FIG. 4 illustrates a flow chart of a method 400 for associating location information of an industrial automation device with maintenance information associated with the industrial automation device, and generating and displaying a visualization that provides location and maintenance information associated with the industrial automation device in an industrial automation system 100. Although the following description of the method 400 is described in a particular order, it should be noted that the method 400 is not limited to the depicted order, and instead, the method 400 may be performed in any suitable order. Moreover, although the method 400 is described as being performed by the monitoring system 110, it should be noted that it may be performed by any suitable computing device.

In certain embodiments, as mentioned above, the database 120 may include data files of various manufactured or designed industrial automation systems 100. The data files may provide an indication of a location of each piece of industrial automation equipment, each industrial automation device, and other component that may be part of the industrial automation system 100. The data file and the associated location information may be provided via a manual input after the respective industrial automation system 100 is designed or manufactured. Alternatively, the monitoring system 110 or other suitable device may crawl the networked components of the industrial automation system 100. As such, the monitoring system 110 may access each IP address of a particular set of IP addresses to determine whether an industrial automation device corresponds to the respective IP address. After accessing the industrial automation device via the respective IP address, the monitoring system 110 may identify a type of industrial automation device, dimensions for the industrial automation device, a cabinet specification for the industrial automation device, and the like. In addition, the monitoring system 110 may determine whether location information for the industrial automation device is included in a memory or storage for the device. The location information may provide some context with regard to other industrial automation components that are within a proximity (e.g., adjacent cabinets) with respect to the respective industrial automation device. In some embodiments, the monitoring system 110 may predict a layout of the industrial automation devices based on the IP addresses associated with the devices and the data acquired from each device. In any case, after the layout and locations of the industrial automation devices are defined, the data file may include details that provide the location information for each respective industrial automation device of the industrial automation system 100.

Keeping this in mind and referring now to FIG. 4, at block 402, the monitoring system 110 may receive a command to display a visualization indicative of location and maintenance information (e.g., an active maintenance status) associated with an industrial automation device in an industrial automation system 100. For example, the monitoring system 110 may receive a command from a user to display a visualization of a location of an industrial automation device that has an active maintenance status indicative of a maintenance request for the industrial automation device. In certain embodiments, the monitoring system 110 may receive the command from a computing device 130 associated with a user and the command may include a request for a particular industrial automation device, a particular type of industrial automation device, a subset of industrial automation devices that have maintenance flags or requests, a subset of industrial automation devices that are online, a subset of industrial automation devices that are offline, or the like.

After receiving the command to display a visualization that provides location and maintenance information associated with the industrial automation device in the industrial automation system 100, at block 404, the monitoring system 110 may send a request to the industrial automation equipment 112, 114, 116 in the industrial automation system 100 for identification information and maintenance information associated therewith. As described above, the identification information of an industrial automation device may include a unique identifier that includes a combination of the serial number, the vendor code, the product code, the product type, the internet protocol (IP) address, or the like, associated with the industrial automation device. In certain embodiments, the unique identifier may be associated with the maintenance information of an industrial automation device. The maintenance information may include a maintenance status (e.g., a one-word or two-word descriptor) of the industrial automation device, a description of one or more operational problems with the industrial automation device, or the like.

At block 406, the monitoring system 110 may receive the identification information and the maintenance information associated with the industrial automation devices from the industrial automation equipment 112, 114, 116. In certain embodiments, the monitoring system 110 may receive the identification information and the maintenance information associated with the industrial automation devices from an industrial automation equipment control system 102, 104, 106 via the network 118.

At block 408, the monitoring system 110 may send a request to the database 120 for location information associated with the one or more industrial automation devices associated with the received identification information at block 406. In certain embodiments, the monitoring system 110 may send the request to the database 120 for the location information based on the one or more unique identifiers associated with one or more respective industrial automation devices. As described above, the location information may include a location identifier associated with the industrial automation device in the industrial automation system 100. The location identifier for an industrial automation device may include an industrial automation equipment identifier, a cabinet identifier, a section identifier, a compartment identifier, or the like. At block 410, the monitoring system 110 may receive the location information associated with the one or more industrial automation devices from the database 120. In certain embodiments, the received location information is associated with the one or more unique identifiers associated with one or more respective industrial automation devices.

At block 412, the monitoring system 110 may then associate the received location information with the received identification information and maintenance information for each identified industrial automation device in the industrial automation system 100. In certain embodiments, the monitoring system 110 may associate the received location information with the received identification information and maintenance information for each industrial automation device using the unique identifier associated with each industrial automation device. For example, the monitoring system 110 may match a first unique identifier associated with the location information of an industrial automation device to a second unique identifier associated with the maintenance information of the industrial automation device before associating the location information with the maintenance information for an industrial automation device.

After associating the location information with the maintenance information for each industrial automation device in the industrial automation system 100, at block 414, the monitoring system 110 may generate a visualization that provides location and maintenance information associated with an industrial automation device based on the received command at block 402. As described above, the visualization may include a device tree, a device map, or the like, to provide location information associated with the industrial automation device in the industrial automation system 100. By way of example, the visualization may include a device tree that indicates the location of an industrial automation device in relation to other industrial automation devices in the industrial automation system 100. The device tree may include an industrial automation equipment identifier, a cabinet identifier, a section identifier, a compartment identifier, or the like. That is, the device tree for an industrial automation device may provide information related to the industrial automation equipment in which the industrial automation device is located, the cabinet of the industrial automation equipment in which the industrial automation device is located, the section of the cabinet in which the industrial automation device is located, the compartment of the section in which the industrial automation device is located, or the like.

In certain embodiments, the visualization may include a device map that provides a virtual representation of the physical layout of the industrial automation device and nearby industrial automation devices in the industrial automation equipment 112, 114, 116. The virtual representation of the physical layout provided by the device map may be proportionally sized to the actual layout of the industrial automation devices in the industrial automation system 100. That is, the virtual representation of a compartment, a section, a cabinet, an industrial device equipment, or the like, may be proportionally sized in relation to nearby compartments, sections, cabinets, industrial device equipment, or the like, in the industrial automation system 100. For example, the virtual representation of a first compartment in a section that is twice as large as a second compartment in the section is twice as large as the virtual representation of the section compartment.

When generating the device map, the monitoring system 110 may retrieve dimensional data from the database 120 that includes data related to the dimensions or form factor of each industrial automation device. Based on the dimensional data and the location information, the monitoring system 110 may generate the device map visualization that represents the locations and dimensions of the industrial automation devices. Additional details with regard to the visualization, the device tree, and the device map will be discussed below with reference to FIGS. 5 and 6.

At block 416, the monitoring system 110 may display the visualization that provides the location and maintenance information associated with the industrial automation device via an electronic display. In certain embodiments, the monitoring system 110 may send a command to a computing system 130 to display the visualization of the location and maintenance information associated with the industrial automation device. As such, the monitoring system 110 may send the generated visualization to the computing device 130 for display.

As mentioned above, in some embodiments, the visualization may include an action card that provides maintenance information associated with an industrial automation device on a first portion of the action card, and location information associated with the industrial automation device on a second portion of the action card. As such, the action card may enhance an efficiency in providing maintenance and location information associated with an industrial automation device to maintenance personnel.

Figure 5:
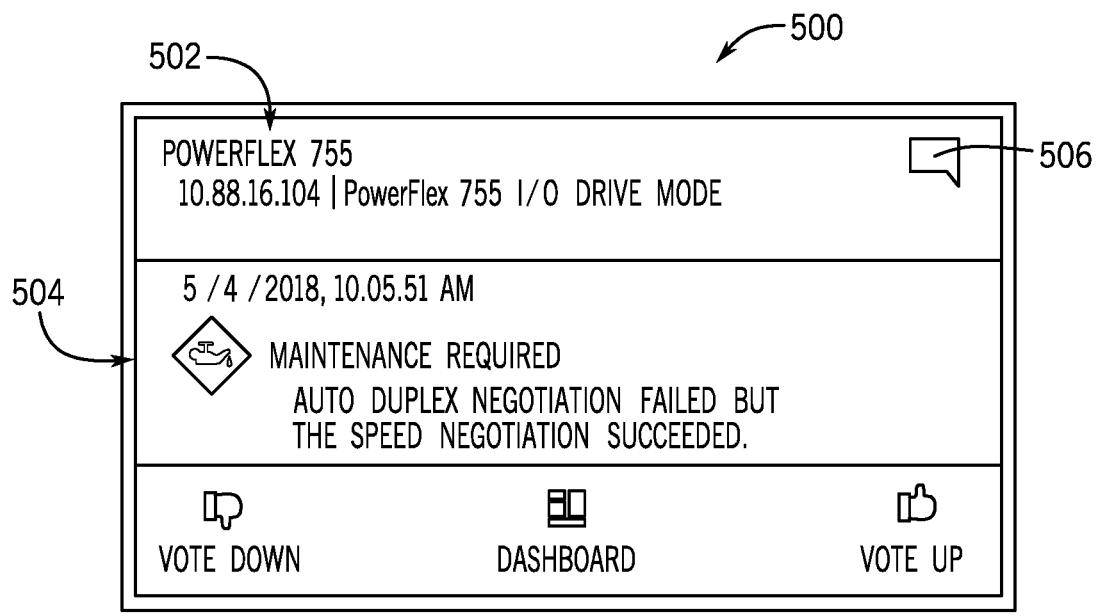
FIG. 5 illustrates an example of a first side of an action card visualization that may be generated and displayed based on information acquired via the method of FIG. 4, in accordance with embodiments described herein.

With this in mind, FIG. 5 illustrates an exemplary embodiment of a visualization 500 of an action card that may be generated and displayed after the relevant information is acquired based on the method 400 described above. The visualization 500 of the action card may include an identification portion 502 that provides identification information associated with an industrial automation device. In certain embodiments, the identification portion 502 may include a product name, a product type, an IP address, or the like, associated with the industrial automation device. The visualization 500 may also include a maintenance portion 504 that provides maintenance information associated with an industrial automation device. As described above, the maintenance information may include a maintenance status associated with the industrial automation device, a description of one or more maintenance issues associated with the industrial automation device, or the like. In the illustrated embodiment, the maintenance status indicates that maintenance is requested on the industrial automation device, and the description provides details concerning the maintenance issue with the industrial automation device.

Figure 6:
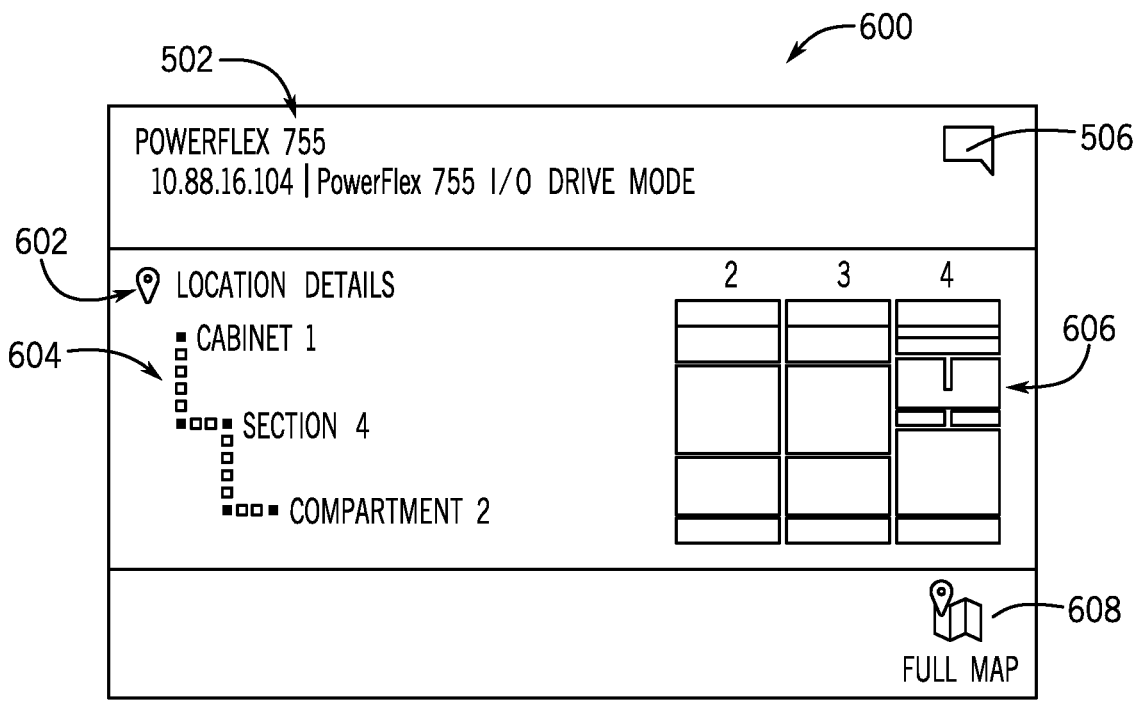
FIG. 6 illustrates an example of a second side of the action card visualization of FIG. 5, in accordance with embodiments described herein.

The visualization 500 may also include a selectable graphic 506 to flip or rotate the action card to provide location information associated with the industrial automation device as shown in FIG. 6. FIG. 6 illustrates an exemplary embodiment of a visualization 600 of the action card depicted in FIG. 5 after receiving the input via the graphic 506 or other suitable input. The visualization 600 of the action card may include the identification portion 502 as described above with regard to FIG. 5. The visualization 600 may also include a location portion 602 that provides location information associated with the industrial automation device.

As described above, the location information may include a device tree 604 that provides a hierarchical representation of the location of the industrial automation device. In addition, the location information may include a device map 606 that provides a virtual representation of a physical layout of the industrial automation device in relation to nearby industrial automation devices. In the illustrated embodiment, the device tree 604 may include a cabinet identifier that indicates that the industrial automation device is located in cabinet 1, a section identifier that indicates that the industrial automation device is located in section 4, and a compartment identifier that indicates that the industrial automation device is located in compartment 2.

The device map 606 provides a virtual representation of the physical layout of one or more sections of an industrial automation equipment. The sections displayed in the device map 606 may include the section in which the industrial automation device is located and neighboring sections related to the industrial device equipment. In the illustrated embodiment, the sections displayed in the device map 606 may include the section in which the industrial automation device is located and the two nearest neighboring sections with respect to the section in which the industrial automation device is located. Although the illustrated embodiment shows three sections in the device map 606, any suitable number of sections of the industrial automation equipment may be shown to provide suitable context to the location of the industrial automation device in the industrial automation equipment.

Each section of the device map 606 may include one or more blocks that correspond to respective physical locations of each industrial automation device may be located. In some embodiments, the blocks may represent compartments, sections, cabinets, industrial automation equipment, or a combination thereof. The blocks may vary in size depending on the actual size of the location of the industrial automation device in relation to each other block. For example, a first block that corresponds to a first compartment may be three times as large as a second block that corresponds to a second compartment if the actual size of the first compartment is three times as large as the actual size of the second compartment. Additionally, the block in which the industrial automation device is located may be highlighted, shaded, animated, blinking, or include some other visual effect to distinguish it from the surrounding compartments in the device map 606. By providing a virtual representation of the physical layout or physical position of the industrial automation equipment that is proportional in size to the actual layout or actual position of the industrial automation equipment, the device map 606 may provide a contextualized representation of the location of an industrial automation device in a particular industrial automation equipment.

Like the visualization 500, the visualization 600 may also include the selectable graphic 506 to flip or rotate the action card to provide maintenance information associated with the industrial automation device as shown in FIG. 5.

With the foregoing in mind, FIG. 7 illustrates a flow chart of a method 700 for displaying various visualizations that provide location information, maintenance information, or both, associated with one or more industrial automation devices in the industrial automation system. The visualizations present the location information and the maintenance information associated with an industrial automation device to a user in different ways, thereby allowing a user to access more detailed or less detailed information more efficiently. Although the following description of the method 700 is described in a particular order, it should be noted that the method 700 is not limited to the depicted order, and instead, the method 700 may be performed in any suitable order. Moreover, although the method 700 is described as being performed by the monitoring system 110, it should be noted that it may be performed by any suitable computing device.

Referring now to FIG. 7, at block 702, the monitoring system 110 may receive a request to display location or maintenance information for an industrial automation device or certain industrial automation devices, as described above in block 402. At block 704, the monitoring system 110 may generate the visualization 500, the visualization 600, or both related to the action card for the requested device. As discussed above, the action card may provide location information associated with the industrial automation device that includes the device tree 604 and the device map 606. At block 706, the monitoring system 110 may display the visualization 600 of the action card with the device tree 604 and the device map 606.

In certain embodiments, a user may request additional information associated with the industrial automation device that has an active maintenance status or request or nearby industrial automation devices. For example, a user may determine that a cause of a maintenance issue with an industrial automation device is not local to the industrial automation device and may affect nearby industrial automation devices. In such a case, the user may request for additional information related to location and maintenance information associated with the nearby industrial automation devices. As such, at block 708, the monitoring system 110 may receive an input to display an expanded view of the device map 606. At block 710, the monitoring system 110 may generate a visualization that provides the expanded view of the device map 606, and at block 712, the monitoring system 110 may display the visualization that provides the expanded view of the device map 606. Additional details with regard to the expanded view of the device map will be discussed below in reference to FIG. 8.

FIG. 8 illustrates an exemplary embodiment of a visualization 800 of an expanded view of the device map 606 that may be generated by the method 700 as described above. The visualization 800 may include a list portion 801 that contains a plurality of tabs corresponding to each industrial automation device in the industrial automation system 100. In certain embodiments, the list portion 801 may include a tab for each of the monitoring system 110, the database 120, and the computing device 130. For example, tab 804 may correspond to the monitoring system 110. In addition to the computing devices or database, the tabs in the list portion 801 may contain identification and maintenance information associated with various industrial automation devices. For example, tab 806 contains a product name ("PowerFlex 755"), a product type ("PowerFlex 755 Drive"), an IP address ("10.88.16.101"), and a maintenance status ("Maintenance Required") for the corresponding industrial automation device. In another example, tab 808 contains a product name ("1756-IB32/B DCIN"), a product type ("1756-IB32/B DCIN"), an IP address ("192.168.1.30/1:2"), and a maintenance status ("Healthy"). It should be noted that the identification information and maintenance information described above with each tab in the list portion 801 are exemplary and each tab in the list portion may include additional information or less information as shown.

The visualization 800 may also include an expanded device map portion 802 that displays identification, maintenance, and location information associated with various industrial automation devices. In certain embodiments, after receiving a user selection of a tab in the list portion 801, the monitoring system 110 may dynamically update the expanded device map portion 802 to display identification, maintenance, and location information associated with the corresponding industrial automation device. For example, after selection of tab 808, the monitoring system 110 may update the expanded device map portion 802 to display identification, maintenance, and location information associated with the 1756-IB32/B DCIN device.

The expanded device map portion 802 may also include an identification header 810 that provides identification information associated with an industrial automation device. The identification header 810 may contain a product name, a product type, an IP address, or the like. In certain embodiments, the identification header 810 may contain the same information as the corresponding tab 806 in the list portion 501 of the visualization 800. The expanded device map portion 802 may also include a maintenance header 812 that provides maintenance information associated with the industrial automation device. The maintenance header 812 may provide a maintenance status, a description of the maintenance status, or the like. In the illustrated embodiment, for example, the maintenance header 812 may provide a maintenance status that indicates that the industrial automation device requests maintenance and a description of a specific maintenance issue with the industrial automation device. In certain embodiments, the maintenance header 812 may provide a graphic that corresponds to the maintenance status.

The expanded device map portion 802 may also include a location window 814 that provides a device tree 816, an elevated view 818 of a device map, and the like. In certain embodiments, the device tree 816 may correspond to the device tree 604 of FIG. 6 and provide a cabinet identifier, a section identifier, a compartment identifier, or the like. The elevated view 818 of the device map may be proportional in size to the device map 606 of FIG. 6 and provide location and maintenance information associated with each industrial automation device in each compartment. For example, in the illustrated embodiment, the elevated view 818 of the device map may provide a block diagram of a plurality of sections of an industrial automation equipment. Although the elevated view 818 of FIG. 7 provides a block diagram of four sections, any suitable number of sections may be included in the block diagram to provide context to the location information associated with the industrial automation devices. Each section of the block diagram may have one or more blocks that correspond to compartments in which industrial automation devices are located. Additionally, each block may contain identification, location, and maintenance information associated with the industrial automation device located in the corresponding compartment. For example, block 820 includes identification, location, and maintenance information associated with the PowerFlex 755 Drive. Further, the block (e.g., 820) corresponding to the selected tab (e.g., 806) in the list portion 801 may be highlighted, shaded, in a different color, or the like to distinguish the block from the surrounding blocks.

In certain embodiments, a visualization of device map 606, the expanded view of the device map 800, or the like may be used in an augmented reality system to direct a user to the compartment in which an industrial automation device is located. For example, in an augmented reality environment, the visualization of the device map 606, the expanded view of the device map 800, or the like, may be mapped or overlaid on actual industrial automation equipment visible through augmented reality glasses or visual sensors. As such, the overlaid device map 606 may provide visual cues to direct the user to an appropriate compartment, while the user is in a physical space that corresponds to the industrial automation devices. In certain embodiments, the visual cues may include highlighting, shading, or coloring, a compartment in the augmented reality environment to indicate the compartment the user wishes to locate.

By incorporating the embodiments described herein, the monitoring system 110 may better enable a user to identify and locate particular devices in an industrial automation system more efficiently. Moreover, the visualizations generated using the embodiments described herein may provide for an efficient manner to display location and maintenance information via an electronic display in which screen space is increasingly valuable. That is, as electronic devices become smaller and screen space of a display becomes more compact, it may be useful to present location and maintenance data for industrial automation devices in a manner that maximizes the available physical screen space. As such, the action card, the rotated action card, the device map, device tree, and other visualizations described herein may be used to present data to a user in an efficient manner to enable the user to locate devices to better perform the user's job function.

In addition, it should be noted that the dynamic update to the database 120 for new devices, replacement devices, and the like provide a more effective way to provide location and maintenance data for users. That is, the ability of the monitoring system 110 to detect new devices and update the database 120 may enable the users to track devices more efficiently with updated location information.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A non-transitory, computer-readable medium, comprising computer-executable instructions that, when executed, are configured to cause a processor to:
send a first request to a plurality of industrial automation devices in an industrial automation system for a plurality of respective maintenance statuses associated with the plurality of industrial automation devices;
send a second request to a database for a plurality of respective location datasets associated with the plurality of industrial automation devices;
generate a visualization comprising:
a device tree that represents a hierarchical representation of a location in the industrial automation system associated with a particular device of the plurality of industrial automation devices; and
a device map that represents respective physical sizes of the plurality of industrial automation devices as respective proportionally-sized blocks, wherein a proportionally-sized block of the respective proportionally-sized blocks corresponds to the particular device;
transmit the visualization to an electronic display device for display;
receive, from the visualization, an input to display an expanded device map associated with the plurality of industrial automation devices;
generate an updated visualization comprising the expanded device map, wherein the expanded device map comprises a plurality of respective representations that correspond to the plurality of industrial automation devices in the industrial automation system, wherein each representation of the plurality of respective representations includes a respective maintenance status of the plurality of respective maintenance statuses and a respective location dataset of the plurality of respective location datasets associated with a respective industrial automation device of the plurality of industrial automation devices, and wherein the plurality of respective representations is proportional to the respective physical sizes of the plurality of industrial automation devices in the industrial automation system; and
transmit the updated visualization to the electronic display device for display.

2. The non-transitory, computer-readable medium of claim 1, wherein the electronic display device is configured to provide an augmented reality environment to a user.

3. The non-transitory, computer-readable medium of claim 1, wherein the computer-executable instructions cause the processor to receive dimensional data associated with at least one of the plurality of industrial automation devices before generating the visualization, generating the updated visualization, or both.

4. The non-transitory, computer-readable medium of claim 3, wherein the computer-executable instructions cause the processor to receive the dimensional data before generating the updated visualization, and wherein the plurality of respective representations is generated based on the dimensional data.

5. The non-transitory, computer-readable medium of claim 1, wherein the expanded device map comprises a second device tree indicative of one or more relationships between at least two of the plurality of industrial automation devices.

6. The non-transitory, computer-readable medium of claim 5, wherein the second device tree comprises an industrial automation equipment identifier that corresponds to industrial automation equipment in which the respective industrial automation device is located, a cabinet identifier that corresponds to a cabinet of the industrial automation equipment in which the respective industrial automation device is located, a section identifier that corresponds to a section that corresponds to the cabinet in which the respective industrial automation device is located, a compartment identifier that corresponds to a compartment of the section in which the respective industrial automation device is located, or a combination thereof.

7. The non-transitory, computer-readable medium of claim 1, wherein one or more of the plurality of respective maintenance statuses is indicative of one or more respective maintenance requests for one or more industrial automation devices of the plurality of industrial automation devices.

8. The non-transitory, computer-readable medium of claim 1, wherein the updated visualization is configured to replace the visualization displayed by the electronic display device after receiving the input to display the expanded device map.

9. A method, comprising:
sending, via a processor, a first request to a plurality of industrial automation devices in an industrial automation system for a plurality of respective maintenance statuses associated with the plurality of industrial automation devices;
sending, via the processor, a second request to a database for a plurality of respective location datasets associated with the plurality of industrial automation devices;
generating, via the processor, a visualization comprising:
a device tree that represents a hierarchical representation of a location in the industrial automation system associated with a particular device of the plurality of industrial automation devices; and
a device map that represents respective physical sizes of the plurality of industrial automation devices as respective proportionally-sized blocks, wherein a proportionally-sized block of the respective proportionally-sized blocks corresponds to the particular device;
transmitting, via the processor, the visualization to an electronic display device for display;
receiving, from the visualization via the processor, an input to display an expanded device map associated with the plurality of industrial automation devices;
generating, via the processor, an updated visualization comprising the expanded device map, wherein the expanded device map comprises a plurality of respective representations that correspond to the plurality of industrial automation devices, wherein each representation of the plurality of respective representations includes a respective maintenance status of the plurality of respective maintenance statuses and a respective location dataset of the plurality of respective location datasets associated with a respective industrial automation device of the plurality of industrial automation devices, and wherein the plurality of respective representations is proportional to the respective physical sizes of the plurality of industrial automation devices in the industrial automation system; and
transmitting, via the processor, the updated visualization to the electronic display device for display.

10. The method of claim 9, wherein the respective location dataset comprises an identifier associated with a position of the respective industrial automation device with respect to one or more other industrial automation devices of the plurality of industrial automation devices.

11. The method of claim 9, wherein the updated visualization comprises a plurality of tabs that correspond to the plurality of industrial automation devices.

12. The method of claim 11, comprising:
receiving, via the processor, a user input indicative of a selection of a first tab of the plurality of tabs; and
updating, via the processor, the updated visualization to include a visual effect to distinguish a first representation of the plurality of respective representations corresponding to the first tab of the plurality of tabs from additional representations of the plurality of respective representations in the expanded device map.

13. The method of claim 11, wherein the visualization comprises an identification header associated with the expanded device map, wherein the identification header provides identification information associated with the particular device of the plurality of industrial automation devices.

14. The method of claim 11, wherein the plurality of tabs comprises respective identification information associated with the plurality of industrial automation devices, the plurality of respective maintenance statuses associated with the plurality of industrial automation devices, or a combination thereof.

15. A non-transitory, computer-readable medium, comprising computer-executable instructions that, when executed, are configured to cause a processor to:
receive a set of image data of at least a portion of an industrial automation system;
detect one or more industrial automation devices in the set of image data;
send a first request to a database for a plurality of respective location datasets associated with a plurality of industrial automation devices, wherein the plurality of industrial automation devices comprises the one or more detected industrial automation devices and one or more additional industrial automation devices associated with the industrial automation system;
generate an augmented reality (AR) visualization comprising:
a device tree that represents a hierarchical representation of a location in the industrial automation system associated with a first device of the one or more detected industrial automation devices; and
a device map that represents respective physical sizes of the one or more detected industrial automation devices and the one or more additional industrial automation devices as respective proportionally-sized blocks, wherein a proportionally-sized block of the respective proportionally-sized blocks corresponds to the first device;
present the AR visualization via an AR display device;
receive, from the AR display device via the AR visualization, an input to display an expanded device map associated with a second device of the one or more detected industrial automation devices or the one or more additional industrial automation devices;

generate an updated AR visualization comprising the expanded device map, wherein the expanded device map includes one or more visual effects configured to direct a user to the second device, wherein the expanded device map comprises a plurality of respective representations mapped to the plurality of industrial automation devices including the second device, wherein each representation of the plurality of respective representations includes a respective location dataset of the plurality of respective location datasets associated with a respective industrial automation device of the plurality of industrial automation devices, and wherein the plurality of respective representations are proportional to respective physical sizes of the plurality of industrial automation devices in the industrial automation system; and present the updated AR visualization via the AR display device.

16. The non-transitory, computer-readable medium of claim 15, wherein the computer-executable instructions cause the processor to send a second request to the plurality of industrial automation devices in the industrial automation system for a plurality of respective maintenance statuses associated with the plurality of industrial automation devices.

17. The non-transitory, computer-readable medium of claim 16, wherein the plurality of respective representations includes the plurality of respective maintenance statuses associated with the plurality of industrial automation devices.

18. The non-transitory, computer-readable medium of claim 15, wherein a mapping of the plurality of respective representations to the plurality of industrial automation devices comprises the plurality of respective representations being overlaid upon the plurality of industrial automation devices in the AR visualization.

19. The non-transitory, computer-readable medium of claim 15, wherein the AR display device comprises a mobile computing device or augmented reality glasses.

20. The non-transitory, computer-readable medium of claim 15, wherein the one or more visual effects comprise a highlighting of a respective representation mapped to the second device, a shading associated with the respective representation mapped to the second device, a coloring associated with the respective representation mapped to the second device, or a combination thereof.

* * * * *